W. R. Close,

Water Wheel,

N°. 52,358. Patented Jan. 30, 1866.

Witnesses:
F. P. Hale Jr
H. E. Fisher.

Inventor:
W. R. Close.
by his Attorney.
R. H. Eddy.

UNITED STATES PATENT OFFICE.

W. R. CLOSE, OF BANGOR, MAINE, ASSIGNOR TO HIMSELF AND JONES T. DINSMORE, OF SAME PLACE.

IMPROVEMENT IN WATER-WHEEL.

Specification forming part of Letters Patent No. 52,358, dated January 30, 1866.

*To all whom it may concern:*

Be it known that I, W. R. CLOSE, of Bangor, in the county of Penobscot and State of Maine, have made an invention having reference to a Water-Wheel; and I do hereby declare the same to be fully described in the following specification and represented in the accompanying drawings, of which—

Figure 1:
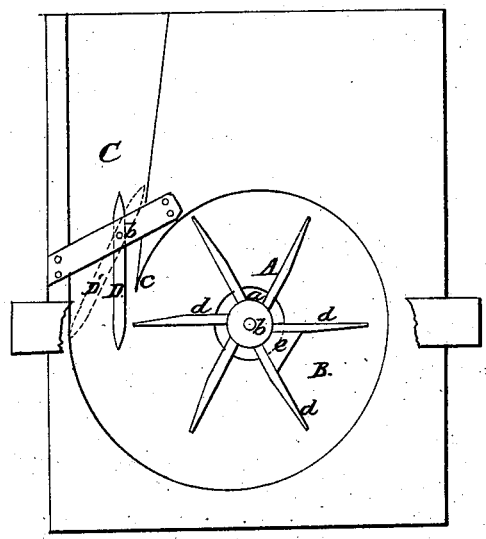
Figure 2:
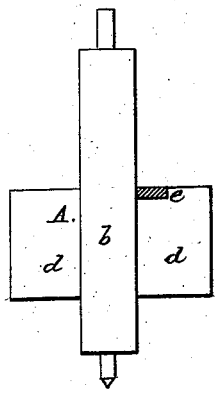

Figure 1 exhibits a top view of a flutter water-wheel, its case, flume, and regulator, to be hereinafter described. Fig. 2 is a vertical section of the wheel.

The nature of my invention consists, principally, in the application to the water-wheel and its flume, at or about at the junction of the flume and the case of the wheel, of a vibratory valve or regulator to play freely on journals and independently of the main gate of the flume, the whole being as hereinafter more particularly set forth.

In the drawings, A denotes the water-wheel, and B the case thereof, such case being at the extremity of a flume, C, leading tangentially or thereabout from it. The vent $a$ for the discharge of the water is through the floor of the case and around the shaft $b$ of the wheel. Within the flume C, and close to its junction with the wheel-case, I arrange a vibratory shutter or valve, D, which I term the "regulator." It is to stand upright within the flume and to be capable of freely vibrating on a vertical axis passing through it at about one-fourth the length of it from one end of it, the position of this axis being represented at $b$ in Fig. 1. When open the regulator stands parallel or about so to a tangent to the circle of revolution of the wheel—that is to say, in the position exhibited in Fig. 1 by the full black line representation of the regulator. When closed the regulator stands across the discharging end of the flume in manner as represented by the dotted lines at D' in Fig. 1. When thus open the regulator projects beyond the part $c$ or angle of junction of the wheel-case and the flume.

Between any two of the radial wings $d\ d$ of the water-wheel I arrange a board or horizontal wing, $e$, to extend from one radial wing to the other. The upward pressure of water against this auxiliary wing while the wheel may be in revolution will be such as to more or less raise the wheel and counteract the downward pressure of its pivot in the step thereof. The auxiliary or horizontal wing thus operates to relieve the pivot of friction in its step.

The regulator being supported by journals and bearings arranged in its axis of motion, the operation of it will be as follows: If we suppose the wheel to be actuating a saw of a saw-mill, the main gate being hoisted to let the water rush through the flume into the wheel-case, the regulator will stand in the direction which the stream takes in entering the case. The action of the water on the regulator is different when the saw is in the kerf of a log than what it is when out of it, for when the saw is within the kerf and meeting with resistance the regulator remains open, but as soon as the saw may have passed out of the kerf and the resistance ceases there will take place such an action of the wheel on the water in its case as to cause such water to be thrown back upon the regulator so as to close it across the flume and more or less arrest the flowage of water into the wheel-case. Thus by the action of the water upon the regulator the saw will retain the same motion without closing the main gate, whether the saw is in or out of the kerf.

Practical experience has fully demonstrated that by the employment of the regulator in the flume in manner and with respect to the wheel and its case, as hereinbefore described, a great and important saving of water will be effected, water which otherwise would be wasted or not be employed with useful effect to the wheel.

What I claim as my invention is—

The application of the regulator to the water-wheel and its flume and independently of the gate of the flume, substantially in manner and so as to operate as specified.

W. R. CLOSE.

Witnesses:
A. L. SIMPSON,
H. L. MITCHELL.